3,446,785
POLYMERIZATION OF OLEFINS
Owen L. Stafford, Midland, Mich., assignor to The Dow Chemical Company, Midland, Mich., a corporation of Delaware
No Drawing. Filed Dec. 9, 1964, Ser. No. 417,221
Int. Cl. C08d 1/30, 1/32
U.S. Cl. 260—93.1       7 Claims The present invention relates to olefinic polymerization processes and relates more particularly to the polymerization of certain olefins in the presence of monoalkyl aluminum dihalides.

One method of polymerizing olefins known to the art is to polymerize the olefin at low temperatures in the presence of a cationic catalyst such as $BF_3$ or an aluminum halide such as $AlCl_3$ or $AlBr_3$, in solution in a low freezing, non-polar solvent.

Cationic catalysts such as aluminum halides or $BF_3$ have only limited solubility in many low freezing organic solvents and their solutions are not as concentrated as would sometimes be desirable. The limited solubility of these catalysts in hydrocarbon solvents restricts proper control of catalyst concentrations in commercial processing operations wherein the polymerization may be effected.

According to the present invention, it has been found that monoalkylaluminum dihalides are effective catalysts for the polymerization of certain olefins, said olefins being selected from the group consisting of isobutylene, alkyl alpha-substituted styrenes, the alkyl group having 1 to 4 carbon atoms, conjugated diolefins containing from 5 to 12 carbon atoms, and mixtures thereof. 1,3-butadiene is not effectively polymerized with monoalkylaluminum dihalide catalyst.

Compared to aluminum halides and $BF_3$, the monoalkylaluminum dihalides have substantially increased solubility in low freezing, non-polar solvents such as hexane, benzene, toluene and the like generally employed for cationic polymerizations. Because of their increased solubility the effective concentrations of the monoalkylaluminum dihalides may be varied over a wide range. In addition, the increased solubility of the monoalkylaluminum dihalide will permit the continuous polymerization of olefinic monomers such as piperylene, cyclopentadiene, isoprene, and isobutylene, which are by origin already present in hydrocarbon solvents such as petroleum distillates.

The polymerization reaction using the monoalkylaluminum dihalide catalyst of the present invention is carried out in either batch or continuous fashion by combining an inert solvent, monomer and catalyst in any convenient order and maintaining the resulting mixture under an inert atmosphere at a temperature of from about $-100°$ C. to about $+100°$ C., more preferably from $-80°$ C. to $+80°$ C. under pressure ranging from ambient to 100 p.s.i.g. until the polymerization reaction has proceeded to the desired extent. Reaction times of 20 to 30 minutes at temperatures around 30° C. give satisfactory yields of polymer. At other temperatures, the reaction time may vary from about 0.1 to about 3 hours.

The inert solvent employed in the polymerization reaction by saturated aliphatic, cycloaliphatic or aromatic hydrocarbons or mixtures thereof. The aromatic hydrocarbons are particularly preferred. Examples of saturated aliphatic hydrocarbons which may be used include straight and branched chain paraffins containing up to and including 10 carbon atoms such as propane, n-butane, n-pentane, isopentate, n-hexane, isohexane, isooctane and n-decane. Illustrative of cycloaliphatics are cyclohexane and methyl cyclohexane. Benzene, toluene, xylene and ethylbenzene are suitable aromatic hydrocarbons. It is to be understood that mixtures of any of the above may also be employed. The inert solvent is usually used in an amount of from 1 to 10 times the volume of monomer. It is preferred to treat the inert solvent prior to use to remove any trace of water which might be present, as by passing the same through a molecular sieve column.

The olefinic monomers which may be polymerized by the process of the present invention include isobutylene, alpha-substituted styrenes such as alpha methylstyrene, alpha butylstyrene and the like and conjugated diolefins containing from 5 to 12 carbon atoms and mixtures thereof. Typical examples of such conjugated diolefins include isoprene, piperylene, cyclopentadiene, 1,3-hexadiene, 1,3-cyclohexadiene, 1,3-heptadiene, 1,3-octadiene, 1,3-cyclooctadiene, 1,3-decadiene and 1,3-dodecadiene.

Suitable monoalkylaluminum dihalides which are useful as catalysts for the polymerization process of the present invention include the lower alkylaluminum dichlorides and dibromides wherein the alkyl group contains from 1 to 10 carbon atoms such as methylaluminum dichloride, methylaluminum dibromide, ethylaluminum dichloride, ethylaluminum dibromide, propylaluminum dichloride, isopropylaluminum dichloride, butylaluminum dichloride, isobutylaluminum dichloride and the like. Particularly good results are obtained with ethylaluminum dichloride.

The amounts of inert solvent, olefinic monomer and catalyst used may vary over a wide range depending on the exact nature of each constituent. The concentration of the total monoalkylaluminum dihalide catalyst is usually about 0.1 percent to 5.0 percent by weight or higher based on the quantity of olefinic monomer employed. As polymerization progresses, the polymer that is formed remains dissolved or dispersed in the inert solvent and the fluid system becomes increasingly viscous. A sufficient quantity of inert solvent is employed to insure that the final reaction product is not too viscous to be removed conveniently from the reactor. Generally, in batch polymerizations, solvent/monomer ratios may vary from about 1:1 to about 10:1.

The inert atmosphere may be supplied by nitrogen, hydrocarbon vapor, argon or other inert gas or the like and should be maintained at least until after the catalyst has been deactivated. Mild agitation is preferred during the course of the reaction to insure formation of a more uniform product. Such agitation may be achieved by mounting the reactor on a rocker or by the use of suitable stirrers in the reactor.

At the end of the polymerization step, the polymer may be recovered by any one of several well-known procedures. The monoalkylaluminum dihalide catalyst is generally deactivated or "killed" by the addition to the polymerization reaction product of a liquid active hydrogen-containing compound, such as water, acid, ketone, alcohol, glycol and the like. Such active hydrogen-containing compounds remove catalyst residues from the polymer solution and generally cause precipitation or coagulation of the previously dissolved polymer. The polymer may be separated from the mixture of unreacted monomer, inert solvent, catalyst residues and treating agent by decantation, filtration, centrifugation, steam stripping, spray drying, devolatilization or any other well-known procedure.

Polymers thus produced are useful as foundry core-binder resins, intermediates for epoxy polymers, or as elastomers and may be cured at elevated temperatures to provide hardened compositions.

The practice of the invention is described in more detail in the following examples which are intended to be illustrative only and not to unduly limit the invention.

Example I

One hundred and fifty milliliters of toluene which had been dried in storage over molecular sieves (type 5A) was added to a citrate of magnesia pressure bottle having a total volume of approximately 300 milliliters. The pressure bottle containing the solvent was placed in the side arm of a glove box and evacuated four times to approximately 40 mm. Hg while being flushed with dry nitrogen. Ethylaluminum dichloride dissolved in toluene (1.0 molar solution) was added by hypodermic syringe (1.0 millimole total catalyst added) and the bottle was tightly stoppered with a neoprene rubber stopper. After removal from the glove box, the stopper was trimmed flush with the top of the bottle and a metal cap containing a hole large enough to admit a hypodermic needle was applied to the bottle. Thirty milliliters of piperylene which had been purified by flash distillation and dried over calcium hydride was added to the bottle by a hypodermic syringe. The bottle was heated in a constant temperature bath for two hours at 55–65° C., after which time the bottle was cooled and the catalyst inactivated with 10 milliliters of methanol. The polymer was isolated by the addition of more methanol, stabilized with 1.0 percent (based on initial monomer) N-phenyl-2-naphthylamine and dried in a vacuum oven at 50° C. Upon drying, 18.8 grams (91 percent conversion) of a viscous liquid polymer of piperylene was recovered.

Example II

Using the procedure of Example I, 30 milliliters of purified isoprene was converted to 13.4 grams (66 percent conversion) of a brittle, semi-solid polymer.

Example III

Cyclopentadiene was obtained by cracking dicyclopentadiene at its boiling point, condensing and then drying the monomer over calcium hydride in cold (−20° C.) storage. The monomer was polymerized for one-hour periods in toluene according to the procedure of Example I with the exception that the order of addition of the components, polymerization temperatures and solvent/monomer ratios were varied to study the effect of these variables. As the data recorded in Table I indicate, the optimum temperature for the polymerization of cyclopentadiene with ethylaluminum dichloride is about 0° C., addition order is important for obtaining soluble polymer and the solvent/monomer ratio is proportional to conversion and affects polymer solubility but does not appreciably affect the inherent viscosity of the polymer. Inherent viscosity was determined using an Oswald type viscosimeter on a solution of the polymer dissolved in toluene at a concentration of 0.25 gram/deciliter at 30° C. An inherent viscosity of 0.2 to 0.6 determined by this method is equivalent to a molecular weight range of about 1300 to about 12,000.

isobutylene was added through a bubbler at a constant rate for 20 minutes until steady refluxing from the Dry Ice condenser was observed whereupon 0.5 millimole of ethylaluminum dichloride in toluene (0.5 molar) was added to the reactor with a hypodermic syringe. The reactants were stirred for 30 minutes after which time the catalyst was inactivated with methanol. Twelve grams of a rubbery polymer was isolated which had an inherent viscosity of 1.24 (0.25 g./dl., 30° C., cyclohexane), which is equivalent to a molecular weight of about 300,000.

Example V

Fifty milliliters of a petroleum distillation fraction having a boiling range of 27°–60° C. obtained from debutanizer bottoms comprised primarily of $C_5$ hydrocarbons including $C_5$ dienes and $C_5$ olefins having the following composition as determined by mass spectroscopic analysis.

| Dienes: | Percent of cut |
|---|---|
| Cyclopentadiene | 3±1 |
| Isoprene+piperylenes | 35±5 |
| Methyl cyclopentadiene | 0.3 |
| Olefins: | |
| Pentenes | 25±3 |
| Hexenes | 1 |
| Methylcyclopentene | 1 |
| Paraffins: | |
| Pentanes | 20±3 |
| Benzene | 4±1 |
| Hexanes | 9±2 | was polymerized in the presence of 1.5 millimoles of ethylaluminum dichloride at 0° C. for two hours following the procedure of Example I with the exception that no solvent was employed in the reaction mixture. The product isolated was 13.0 grams (38 percent conversion) of a viscous liquid polymer.

Example VI

Fifty milliliters of the petroleum fraction of Example V was mixed with 50 milliliters of alpha-methylstyrene and polymerized in the presence of 0.5 millimole of ethylaluminum dichloride at 10° C. for 2.5 hours following the procedure of Example V. The product, precipitated with methanol was 30 grams of a semi-solid polymer.

In a similar manner other olefins such as conjugated

TABLE.—POLYMERIZATION OF CYCLOPENTADIENE WITH ETHYL ALUMINUM DICHLORIDE

| Sample No. | Component[1] addition order | Polym. temp., °C. | Solv./mon. ratio | Conv., percent | Inherent viscosity | Solubility (toluene) |
|---|---|---|---|---|---|---|
| 1 | A | 0 | 5 | 92 | Insoluble | Insoluble. |
| 2 | B | 0 | 5 | 100 | 0.54 | Soluble. |
| 3 | C | 0 | 5 | 47 | Insoluble | Insoluble. |
| 4 | B | 25 | 5 | 97 | 0.30 | Soluble. |
| 5 | B | −78 | 5 | 90 | 0.26 | Do. |
| 6 | B | 0 | 3 | 84 | 0.46 | Do. |
| 7 | B | 0 | 2 | 55 | 0.59 | Mostly soluble. |

[1] Addition Order.—A=1st toluene, 2nd catalyst solution, 3rd monomer; B=Part of toluene, 2nd catalyst solution, 3rd 50/50 mixed toulene/monomer; C=1st toluene, 2nd monomer, 3rd catalyst solution.

Example IV

Isobutylene vapor was fed to a reactor comprised of a 250 milliliter, 3 necked round bottom flask equipped with a magnetic stir bar, nitrogen inlet, monomer inlet (bubbler), thermometer and Dry Ice condenser.

One hundred fifty milliliters of dry toluene was added to the reactor. Temperature was controlled with a Dry Ice/isopropanol bath between −60° and −75° C. The diolefins having 6 to 12 carbon atoms as mentioned above may be reacted with equivalent amounts of other monoalkylaluminum dihalides as mentioned above to prepare useful polymeric products.

What is claimed is:

1. A process for the preparation of synthetic polymers which comprises subjecting to polymerization conjugated diolefins having 5 to 12 carbon atoms in the presence of a catalyst consisting of a monoalkylaluminum dihalide and recovering the polymer so produced.

2. The process of claim 1 wherein the polymerization is conducted at a temperature of about −80° C. to about 100° C.

3. The process of claim 1 wherein the polymerization is conducted in the presence of a catalyst consisting of a monoalkylaluminum dihalide dissolved in an inert solvent.

4. The process of claim 1 wherein the monoalkylaluminum dihalide catalyst is ethylaluminum dichloride.

5. The process of claim 1 wherein the olefin reactant is isoprene.

6. The process of claim 1 wherein the olefin reactant is piperylene.

7. The process of claim 1 wherein the olefin reactant is cyclopentadiene.

References Cited

UNITED STATES PATENTS

| 2,683,139 | 7/1954 | Leary et al. | 260—94.2 |
| 2,768,147 | 10/1956 | Meis et al. | 260—93.55 |
| 3,328,372 | 6/1967 | Thomas et al. | 260—93.1 |
| 3,049,524 | 8/1962 | Voltz | 260—93.5 |

JOSEPH L. SCHOFER, *Primary Examiner.*

L. EDELMAN, *Assistant Examiner.*

U.S. Cl. X.R.

252—431; 260—94.2, 94.8, 93.5